United States Patent Office 2,960,438
Patented Nov. 15, 1960

2,960,438

PURIFICATION OF CARBOMYCIN

Ira J. Friedman, Hicksville, Edward G. Martin, Whitestone, Roy J. Taylor, Flushing, and Richard L. Wagner, Jr., Forest Hills, N.Y., assignors to Chas. Pfizer & Co., Inc., Brooklyn, N.Y., a corporation of Delaware No Drawing. Original application June 18, 1953, Ser. No. 362,672, now Patent No. 2,792,330, dated May 14, 1957. Divided and this application Nov. 7, 1956, Ser. No. 620,987

7 Claims. (Cl. 167—65)

This invention is concerned with a new and highly useful method of recovering and purifying a carbomycin antibiotic. It is also concerned with certain novel compositions formed by the antibiotic during this recovery process.

Carbomycin A and carbomycin B are highly valuable antibiotics which are formed by growth under suitable conditions of selected strains of the microorganism *Streptomyces halstedii*. The compound may be recovered by extraction under certain conditions with water-immiscible organic solvents of various types.

It has now been found that a carbomycin antibiotic readily forms solid complexes, often crystalline in form, with a variety of aromatic organic compounds. In the copending patent application filed on April 6, 1953, by Fred W. Tanner, Jr., et al. under Serial No. 347,152 (now U.S. Patent 2,771,392), there has been described the formation of certain of these complexes by contacting aqueous carbomycin antibiotic solutions with certain aromatic organic compounds, particularly aromatic solvents such as benzene, toluene, etc. under conditions for formation of separate liquid phases. The present application is concerned with the recovery of the carbomycin antibiotic from aqueous solution directly by forming solid complexes which precipitate from said solution. These complexes may be formed by adding a minor proportion of an aromatic compound to aqueous solutions of the carbomycin antibiotic under suitable conditions of pH. The pH should be in the range of approximately neutrality to fairly strongly basic solutions, that is, from about pH 6.5 to about 10, and preferably from about pH 7.0 to about 9. Higher pH's may be used but there is no appreciable benefit to be derived from these, and there may be a tendency to degrade the antibiotic to a certain extent. Appreciably lower pH's than 6.0 are not useful. Most unexpectedly, it has been found that aromatic complexes of the carbomycin antibiotic may be precipitated from very dilute, highly impure aqueous solutions of carbomycin antibiotics, such as fermentation broth.

By "carbomycin antibiotic" is meant a microbiologically active product such as is formed by growth of selected *S. halstedii* organisms in a nutrient solution under suitable conditions. The term includes carbomycin A and carbomycin B.

In general, in the formation of the water-insoluble aromatic compound complexes of the carbomycin antibiotics at least about one molecular weight of the aromatic compound per molecular weight of antibiotic is used to precipitate the product from dilute solution. The aromatic complexes formed seem to contain two or three molecules of antibiotic per molecule of aromatic compound. In general, it is advisable to use excess aromatic compound, most of which are cheap, to assure rapid formation of the complexes and precipitation of a maximum amount. These complexes show a surprisingly low solubility in water. A variety of both liquid and solid aromatic compounds may be used for their formation, for instance normally solid monomeric aromatic compounds selected from the class consisting of hydrocarbons, oxo-substituted hydrocarbons, dihydroxy-substituted hydrocarbons, mononirto-substituted hydrocarbons, amino-substituted hydrocarbons, halo-substituted hydrocarbons, dihydroxy-, mononitro-, mononitro-hydroxy-, amino-, halo-, alkyl- and phenyl-substituted benzene, and halo- and alkyl-substituted benzoic acid.

Normally liquid aromatic compounds may be added to an aqueous solution of a carbomycin antibiotic in an amount from less than is required to saturate the solution to somewhat in excess of that required to saturate (as long as insufficient is used to dissolve the precipitate) and the carbomycin antibiotic activity precipitates. Most of the liquid aromatic compounds have some degree of solubility in water. A normally solid aromatic compound which is soluble in water may also be added in an amount less than is required to saturate the aqueous solution of a carbomycin antibiotic. The solubility may be of a very low order but still sufficient material will dissolve to effect the precipitation. The solid aromatic materials of very low solubility may depend for their carbomycin antibiotic precipitating effectiveness upon formation of complexes at the surface of the solid. The smaller the particle size of the insoluble compound for a given amount of material or the more porous the material (i.e. the larger the surface exposed), the more effective is the removal of antibiotic. In general, at least about 0.2 gram of the insoluble material is used for each 100 milliliters of antibiotic solution but higher quantities may be required for more efficient removal of antibiotic. The optimum amount will vary with patricle size, porosity, nature of the material and other factors. The liquid aromatic compounds may be added directly with agitation to the aqueous solution of carbomycin antibiotic either before or after adjustment of the pH to a suitable range, if this is found necessary. The solid aromatic compounds may be added in finely divided form or those that are soluble may be dissolved in a small volume of a suitable water-miscible organic solvent such as ethanol, acetone, isopropanol, etc. When a suitably small volume of the solvent is used, it interferes in no way with the precipitation of the aromatic complexes of the antibiotic. Furthermore, upon dilution of the solvent solution with aqueous antibiotic solution, the aromatic compound is precipitated in very finely divided form which is very useful since it readily reacts with the antibiotic. In general, both neutral and acidic aromatic organic compounds may be used for the process of this invention. However, certain highly basic aromatic organic compounds are less useful, possibly because of decomposition.

Among the aromatic compounds which are of use for this invention are aromatic hydrocarbons, such as benzene, naphthalene, anthracene, toluene, ethyl benzene, xylene, and various substituted aromatic compounds such as chloro-benzene, p-nitroaniline, ortho-toluic acid, nitrobenzene, resorcinol, and so forth.

A variety of complex technical materials which have as a principal ingredient aromatic compounds may be used for the recovery of carbomycin antibiotics according to the method of this invention. This includes various synthetic resins, such as the ion-exchange resins which are prepared from predominantly aromatic type compounds, such as phenol-formaldehyde-amine type resins, divinylbenzene - unsaturated aliphatic acid type resins, sulfonated aromatic resins, such as the polystyrene or the polystyrene-divinylbenzene type compounds. By contacting dilute aqueous solutions of a carbomycin antibiotic even such crude solutions as fermentation broth, with the aromatic solid material, the antibiotic is adsorbed to an appreciably extent and may be removed from the aqueous solution as a complex with the solid material. The complexes formed with many of the simpler aromatic hydrocarbons are crystalline.

The most useful procedure for the removal of the antibiotic from the aromatic complexes is by contacting the complexes with dilute aqueous acid. The acid used may be either an inorganic acid such as sulfuric, hydrochloric, hydrobromic, phosphoric, etc. or an organic acid such as acetic acid, chlor-acetic acid, tartaric acid, citric acid, gluconic acid, etc. The acid should have a dissociation constant of at least about $1 \times 10^{-5}$. In general, a concentration of acid of about 10% or less is used and sufficient of the acid to furnish at least one equivalent per equivalent of carbomycin antibiotic is necessary. The acid is often used in an appreciable excess. The aromatic compound is then separated from the aqueous solution of carbomycin antibiotic salt which is formed. If the aromatic compound is one which is a solid and insoluble in the dilute acid, it is merely filtered, centrifuged or removed in some other manner. Liquid, aromatic compounds and the non-polymeric solid compounds may be extracted into a water-immiscible organic solvent which does not form complexes with the antibiotic under the prevailing conditions. Saturated aliphatic hydrocarbons are useful for this purpose. However, these must be free of aromatic compounds.

If the aromatic complexing compound is reasonably volatile, it may be distilled out of an acidified aqueous solution of the carbomycin salt. Such compounds as benzene, toluene, ethyl benzene, xylene, etc. form azeotropes with water and may be removed with relative ease. The application of a reduced pressure and slightly elevated temperature will assist in this operation. Alternatively, the complex with a reasonably volatile aromatic organic solvent may be dissolved in a volatile, non-aromatic organic solvent such as methanol and the aromatic compound may be distilled off with part of the second solvent. For example, methanol forms a readily distilled azeotrope with toluene.

The aqueous solutions of a carbomycin antibiotic salt obtained as described above are useful of themselves for inhibiting the growth of microorganisms or a solid form of carbomycin base or a carbomycin salt may be recovered from solution. It is not advisable to evaporate a solution of a carbomycin salt in a highly acid solution. However, excess acid may be neutralized and the product may be dried or the aqueous solution may be made sufficiently basic to cause the precipitation of carbomycin base generally obtained in crystalline form. In some cases the aromatic complexes of the antibiotic may be used as such. For instance, when the antibiotic is combined with a non-toxic solid aromatic hydrocarbon adsorbent, such as one of the ion-exchange resins, or simply a polyaromatic resinous material, the complex with the antibiotic may be used for the enrichment of animal feeds.

In the preparation of the complex carbomycin compounds of this invention, it is generally necessary to use at least about one molecular proportion of the aromatic type compound to assure formation of the compounds. The exact composition of all of these products is not known. However, certain of the products have been shown to contain two or three molecules of antibiotic per mole of aromatic compound. The proportion of aromatic compound to carbomycin antibiotic in various complexes is not a fixed quantity, but may vary depending upon the particular aromatic compound used to form the crystalline compounds. It is obvious that in the case of the use of the solid aromatic compounds the proportion of carbomycin combined with the material may be limited by the state of subdivision of the aromatic compound. Thus, if large solid particles of the aromatic compound are used, only the surface layers of the aromatic compound are available for combination with the antibiotic.

The following examples are given by way of illustration and are not intended as a limitation of this invention. Indeed, as many apparently widely different embodiments of the present invention may be made without departing from the spirit and scope hereof, it is to be understood that the invention is only limited as defined in the appended claims.

*Example I*

Carbomycin antibiotic fermentation broth was prepared by growing a selected strain of *Streptomyces halstedii* on a nutrient liquid medium under submerged aerobic conditions as described in the copending patent application referred to above. The broth was filtered at a low pH to remove solid mycelial matter. The clarified solution was adjusted to a pH of 8.5, and a one-hundred milliliter portion was then treated with 0.2 gram of benzene. The mixture was stirred for about 15 minutes and the solid product that separated was filtered. The filtrate was tested for carbomycin activity using a standard bacteriological technique. It was shown that 80% of the antibiotic activity had been removed as a precipitate with benzene. The activity was recovered by contacting the precipitate with water acidified with hydrochloric acid.

*Example II*

A series of tests were run in exactly the same manner as described in Example I but using a variety of aromatic compounds. These are listed below together with the percentage of the carbomycin activity that was removed from fermentation broth by addition of 0.2 gram of the substance per one-hundred milliliters of broth.

| Compound | Percent Antibiotic Removed |
| --- | --- |
| Ethyl Benzene | 69 |
| Monochlorobenzene | 70 |
| p-Dichlorobenzene | 85 |
| p-Nitrochlorobenzene | 71 |
| Toluene | 70 |
| Toluidine | 22 |
| o-Toluic Acid | 37 |
| Cumene | 60 |
| Mesitylene | 94 |
| Benzyl Chloride | 96 |
| p-Nitroaniline | 88 |
| o-Nitrophenol | 29 |
| 2,4-Dichlorobenzoic acid | 34 |
| Resorcinol | 52 |
| Naphthalene | 87 |
| Diphenyl | 11 |
| Anthracene | 30 |
| Anthraquinone | 23 |

*Example III*

Carbomycin fermentation broth, prepared as described in Example I above, was filtered and adjusted to pH 8.5. One hundred milliliter portions of the broth were contacted individually with one gram samples of various ion-exchange resins. The mixtures were stirred for approximately one-half hour and then filtered. The percentage of carbomycin removed from the broth was determined by means of a standard microbiologically assay procedure. In the following table are listed the resins, together with the percent of the antibiotic removed from the solution.

| Resin | Percent Antibiotic Removed |
| --- | --- |
| Amberlite IRC-50 | 17 |
| Amberlite XE-89 | 28 |
| Amberlite IR-112 | 30 |
| Dowex 50 (containing 1% divinyl benzene) | 53 |
| Dowex 50 (containing 2% divinyl benzene) | 43 |
| Duolite C-10 | 40 |
| Permutit Deacidite | 17 |

("Amberlite IRC-50" and "Amberlite XE-89" are carboxylic acid ion-exchange resins, the former being a bead type copolymer of methacrylic acid with 2½ to 10% divinyl benzene, and the latter a copolymer of acrylic acid with divinyl benzene; "Amberlite IR-112" is a sulfonic acid ion-exchange resin which is of the phenol formaldehyde type. The two "Dowex 50" resins are copolymers of sulfonated polystyrenes with the specified two different proportions of divinyl benzene. "Duolite C-10" is a phenol formaldehyde sulfonic acid cation-exchanger, of high porosity. "Deacidite" is a weakly basic phenol formaldehyde polyamine type anion-exchanger.)

*Example IV*

Portions of filtered carbomycin broth (160 milliliters each) were adjusted to different pH's and then contacted with 0.16 gram of naphthalene and of p-dichlorobenzene in finely divided form. The mixtures were agitated for approximately fifteen minutes and filtered. The solution was then assayed to determine how much of the antibiotic had been removed by formation of complexes on the surface of the solid aromatic compounds. The following table summarizes the results.

| pH | Percent combined with Naphthalene | Percent combined with p-Dichlorobenzene |
|---|---|---|
| 8.0 | 87 | 78 |
| 9.0 | 90 | 85 |
| 9.5 | 90 | 85 |

A test on a separate portion of the antibiotic broth showed that there was little destruction of the antibiotic under the conditions of the experiment at pH 9.5.

*Example V*

Portions of carbomycin fermentation broth at pH 8.7 were stirred and treated with naphthalene, p-dichlorobenzene, and p-nitroaniline respectively using 0.2% by weight of broth. The aromatic compounds were dissolved in small volumes of methanol to facilitate introduction. After one hour the solid material was filtered with the use of a diatomaceous earth filter aid. The filter cakes were partially dried and then divided in half. One portion of each filter cake was extracted with acetone and the second portion was extracted with a buffer solution adjusted to pH 2.5 with phosphoric acid. The following table summarizes the percent of antibiotic removed from the solution by the aromatic compounds and the percent of the antibiotic originally present in the broth which was recovered by acetone extraction and by dilute acid extraction.

| Compound | Percent Precipitated or Adsorbed | Percent Broth Activity Recovered | |
|---|---|---|---|
| | | In Acetone | In Acid Water |
| Naphthalene | 90.2 | 83 | 79 |
| p-Dichlorobenzene | 80 | 66 | 72 |
| p-Nitroaniline | 85 | 78 | 84 |

*Example VI*

One hundred and five gallons of filtered carbomycin fermentation broth from which calcium had been removed was adjusted to pH 8.4–8.6 with caustic soda solution. Seven hundred and fifty milliliters of toluene were added to the filtered broth and the mixture was stirred for two hours. The solid precipitated toluene complex of carbomycin antibiotics was filtered after the addition of a small amount of a diatomaceous earth filter aid. The solid was filtered on a small plate and frame filter press. The presscake was dried under vacuum at 50° C. for 12 hours. The dried cake was then suspended in 5 liters of methanol. The mixture was stirred thoroughly for one-half hour and then filtered. The filter cake was again suspended in 5 liters of methanol, stirred and filtered. The combined filtrates were concentrated under vacuum to remove methanol and toluene. The solution was concentrated until a potency of about 100,000 units of antibiotic per milliliter was obtained. The mixture was then treated by the slow addition fo one volume of water. The mixture was stirred during this addition. Carbomycin base crystallized from the solution during the addition. This product was obtained in a yield of 63.2% based on the amount of antibiotic originally present in the filtered fermentation broth.

*Example VII*

Nineteen liters of filtered carbomycin fermentation broth from which calcium had been removed was adjusted to pH 8.5 with sodium hydroxide solution. Thirty grams of naphthalene were dissolved in 200 milliliters of acetone and this solution was gradually added to the carbomycin fermentation broth while the mixture was agitated. After stirring for two hours a diatomaceous earth filter aid was added and the solid material was filtered on a porcelain funnel. The filter cake was sucked dry on the funnel and it was then suspended in one liter of water. The suspension was stirred and adjusted to pH 2.5 with phosphoric acid. The mixture was filtered and the filter cake was again suspended in one liter of water. The pH was again adjusted to pH 2.5 with phosphoric acid and the mixture was filtered. The combined filtrates were adjusted to pH 4.5 with sodium hydroxide solution. The solution was then concentrated under vacuum to a volume of 800 milliliters. The concentrate was adjusted to pH 3.0 and extracted twice with one-quarter volume of hexane to remove residual traces of naphthalene. The aqueous phase was adjusted to pH 8.5 with sodium hydroxide solution and carbomycin precipitated. The precipitated product was filtered, dried under vacuum for ten hours and was then redissolved in methanol. Crystalline carbomycin antibiotic was separated by the gradual addition of one volume of water to the methanol. The product was filtered, washed and dried under vacuum. A yield of 60.5% of the antibiotic in the filtered broth was obtained.

This application is a division of our copending application Serial No. 362,672, filed June 18, 1953, now U.S. Patent 2,792,330.

What is claimed is:

1. A process for the precipitation of a carbomycin antibiotic selected from the class consisting of carbomycin A and carbomycin B from an aqueous solution thereof, which comprises contacting said solution at a pH from about 6.0 to about 10.0 with a compound selected from the class consisting of chlorobenzene, benzyl chloride, nitrobenzene and normally liquid aromatic hydrocarbons, in an amount less than is required to form a discrete solvent phase solution of the antibiotic.

2. A process for the recovery of a carbomycin antibiotic selected from the class consisting of carbomycin A and carbomycin B from a fermentation broth, which comprises filtering the mycelium from the fermentation broth and contacting said fermentation broth at a pH of about 8.5 with about 0.2 gram of toluene per 100 milliliters of broth and filtering the precipitated complex.

3. The process of claim 1 wherein the said compound is benzene.

4. The process of claim 1 wherein the said compound is cumene.

5. The process of claim 1 wherein the said compound is ethyl benzene.

6. The process of claim 1 wherein the said compound is monochlorobenzene.

7. A process for the recovery of a carbomycin antibiotic selected from the class consisting of carbomycin A and carbomycin B from a fermentation broth, which comprises filtering the mycelium from the fermentation broth and contacting said fermentation broth at a pH of about 8.5 with about 0.2 gram of benzene per 100 milliliters of broth and filtering the precipitated complex.

References Cited in the file of this patent

UNITED STATES PATENTS

| | | |
|---|---|---|
| 2,378,449 | Tishler | June 19, 1945 |
| 2,482,055 | Duggar | Sept. 13, 1949 |
| 2,516,080 | Sobin | June 18, 1950 |
| 2,653,899 | Bunch et al. | Sept. 29, 1953 |
| 2,771,392 | Tanner et al. | Nov. 20, 1956 |